(12) United States Patent
Migishima

(10) Patent No.: US 8,144,851 B2
(45) Date of Patent: Mar. 27, 2012

(54) COMMUNICATION APPARATUS, AND METHOD AND PROGRAM FOR CONTROLLING THE SAME

(75) Inventor: Isao Migishima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1449 days.

(21) Appl. No.: 11/659,718

(22) PCT Filed: Aug. 29, 2005

(86) PCT No.: PCT/JP2005/016159
§ 371 (c)(1),
(2), (4) Date: Feb. 8, 2007

(87) PCT Pub. No.: WO2006/025542
PCT Pub. Date: Mar. 9, 2006

(65) Prior Publication Data
US 2009/0225965 A1    Sep. 10, 2009

(30) Foreign Application Priority Data
Aug. 30, 2004    (JP) .................................. 2004-249412

(51) Int. Cl.
*H04M 1/56* (2006.01)
*H04M 15/06* (2006.01)
*H04M 1/00* (2006.01)
(52) U.S. Cl. ............................... 379/142.01; 379/355.02
(58) Field of Classification Search ............. 379/142.01, 379/142.04, 142.07, 142.13, 142.15, 88.13, 379/88.19, 93.01, 93.23, 93.24, 355.01–355.06; 455/414.1, 415; 370/352
See application file for complete search history.

(56) References Cited

U.S. PATENT DOCUMENTS

| | | | |
|---|---|---|---|
| 6,229,883 B1 * | 5/2001 | Kakizaki et al. | 379/142.04 |
| 6,757,533 B2 * | 6/2004 | Lampela et al. | 455/415 |
| 6,798,872 B1 * | 9/2004 | Matsumoto et al. | 379/142.01 |
| 7,162,514 B2 | 1/2007 | Hirai | |
| 7,280,647 B2 * | 10/2007 | Henderson | 379/142.01 |
| 2002/0126814 A1 * | 9/2002 | Awada et al. | 379/142.01 |
| 2003/0055981 A1 | 3/2003 | Requena et al. | |
| 2005/0287997 A1 * | 12/2005 | Fournier | 455/415 |

FOREIGN PATENT DOCUMENTS

| | | |
|---|---|---|
| JP | 2003-108481 A | 4/2003 |
| JP | 2003-108482 A | 4/2003 |
| JP | 2004-12157 A | 4/2004 |
| JP | 2004-128793 A | 4/2004 |
| JP | 2005-51445 A | 2/2005 |
| WO | 03/036909 A1 | 5/2003 |

OTHER PUBLICATIONS

International Search Report mailed Oct. 18, 2005.
International Preliminary Report on Patentability mailed Jul. 11, 2006.

* cited by examiner

*Primary Examiner* — Quoc D Tran
(74) *Attorney, Agent, or Firm* — Fitzpatrick, Cella, Harper & Scinto

(57) ABSTRACT

To update phone book data (identification information necessary for connection to one's own apparatus stored in communication partner information storing means of a communication partner) of a communication apparatus easily, inexpensively, quickly, and reliably.

2 Claims, 16 Drawing Sheets

FIG. 7

701
INVITE sip: 34rou@cc.cc.cc SIP/2.0
Via: SIP/2.0/UDP 192.1.1.1: 5060
To: SANSHIRO <sip: 34rou@cc.cc.cc>
From: ICHIRO <sip: 1rou@aa.aa.aa>
Call-ID: a5-32-43-12-77@192.1.1.1
CSeq: 1 INVITE
Contact: <sip: 1rou@192.1.1.1>   702

703
INVITE sip: 34rou@cc.cc.cc SIP/2.0
Via: SIP/2.0/UDP 192.100.100.100: 5060
Via: SIP/2.0/UDP 192.1.1.1: 5060
To: SANSHIRO <sip: 34rou@cc.cc.cc>
From: ICHIRO <sip: 1rou@aa.aa.aa>
Call-ID: a5-32-43-12-77@192.1.1.1
CSeq: 1 INVITE
Contact: <sip: 1rou@192.1.1.1>   704

705
SIP/2.0 200 OK
Via: SIP/2.0/UDP 192.3.3.3: 5060
To: ICHIRO <sip: 1rou@aa.aa.aa>
From: SANSHIRO <sip: 34rou@cc.cc.cc>
Call-ID: a5-32-43-12-77@192.1.1.1
CSeq: 1 INVITE
Contact: <sip: 34rou@192.3.3.3>   706

707
SIP/2.0 200 OK
Via: SIP/2.0/UDP 192.100.100.100: 5060
Via: SIP/2.0/UDP 192.3.3.3: 5060
To: ICHIRO <sip: 1rou@aa.aa.aa>
From: SANSHIRO <sip: 34rou@cc.cc.cc>
Call-ID: a5-32-43-12-77@192.1.1.1
CSeq: 1 INVITE
Contact: <sip: 34rou@192.3.3.3>   708

FIG. 10

```
MESSAGE im: 1rou@aa.aa.aa SIP/2.0
Via: SIP/2.0/UDP 172.4.4.4
To: ICHIRO <im: 1rou@aa.aa.aa>
From: SANSHIRO <im: 34rou@dd.dd.dd>
Call-ID: a5-32-43-12-77@172.4.4.4
CSeq: 1 MESSAGE
content-Type: text/plain
Content-Length 90

! ! ! ! replace-telephone-number   ~1002
name: 34rou   ~1003
old address: 192.3.3.3   ~1004
new address: 192.4.4.4   ~1005
old uri: 34rou@cc.cc.cc   ~1006
new uri: 34rou@dd.dd.dd   ~1007
```
~1001

FIG. 11

```
SIP/2.0 200 OK
Via: SIP/2.0/UDP 172.1.1.1: 5060
To: SANSHIRO <im: 34rou@dd.dd.dd>
From: ICHIRO <im: 1rou@aa.aa.aa>
Call-ID: a5-32-43-12-77@172.4.4.4
CSeq: 1 MESSAGE
Content-Length 0
```
↙1101

```
SIP/2.0 200 OK
Via: SIP/2.0/UDP 192.100.100.100: 5060
Via: SIP/2.0/UDP 172.1.1.1: 5060
To: SANSHIRO <im: 34rou@dd.dd.dd>
From: ICHIRO <im: 1rou@aa.aa.aa>
Call-ID: a5-32-43-12-77@172.4.4.4
CSeq: 1 MESSAGE
Content-Length 0
```
↙1102

FIG. 16

```
INVITE sip: 34rou@192.3.3.3 SIP/2.0          1602
Via: SIP/2.0/UDP 192.1.1.1: 5060                          1601
To: SANSHIRO <sip: 34rou@192.3.3.3>
From: ICHIRO <sip: 1rou@192.1.1.1>
Call-ID: a5-32-43-12-77@192.1.1.1
CSeq: 1 INVITE
Contact: <sip: 1rou@192.1.1.1>
```

```
SIP/2.0 200 OK
Via: SIP/2.0/UDP 192.3.3.3: 5060                          1602
To: ICHIRO <sip: 1rou@192.1.1.1>
From: SANSHIRO <sip: 34rou@192.3.3.3>
Call-ID: a5-32-43-12-77@192.1.1.1
CSeq: 1 INVITE
Contact: <sip: 34rou@192.3.3.3>
```

COMMUNICATION APPARATUS, AND METHOD AND PROGRAM FOR CONTROLLING THE SAME

TECHNICAL FIELD

The present invention relates to a communication apparatus which includes a communication partner information storing means for storing identification information for establishing a connection with a communication partner, and a method and a program for controlling the same.

BACKGROUND ART

In a phone terminal having a phone book connected to a general public line, there have conventionally been proposed methods of notifying changed contents of one's own phone number through an electronic mail message to a partner so as to execute phone book data updating work, and analyzing the contents of the mail message on partner's phone terminal side to automatically update the phone book data (Japanese Patent Application Laid-open No. 2003-108481 and Japanese Patent Application Laid-open No. 2003-108482).

Recently, there is known a technology of carrying out voice (or even image) communication not only by a phone terminal connected to the general public line but also by an Internet phone (VoIP) system has been known. It is believed that the automatic updating of the phone book data through an electronic mail message as described above can be also carried out by an IP phone terminal connected to an IP network.

DISCLOSURE OF THE INVENTION

However, a method of updating identification information necessary for connection to one's own apparatus stored by a communication partner is performed through electronic mail as in the case of those described in the above Patent Documents. Thus, there is no way to check whether the partner has surely received a message of phone book updating, resulting in a problem in that non-receipt of the electronic mail message is not realized or is realized only at a later time when an electronic mail address of the partner has been changed or the like.

To receive the electronic mail by connecting to the public line, it is necessary to access an electronic mail server different from that of normal phone communication from a phone terminal side, causing a problem in that automatic updating of the phone book is suspended until the access is performed.

Furthermore, there is a problem in that an electronic mail transmitting/receiving function which may not be necessary depending on product specifications must be implemented on the phone terminal side.

With the aforementioned problems in mind, an object of the present invention is to update identification information necessary for connection to one's own apparatus stored by a communication partner easily, inexpensively, quickly, and reliably.

In order to solve the above problems, in a communication apparatus which includes a communication partner information storing means for storing identification information to establish a connection to a communication partner, and a method and a program for controlling the communication apparatus, the present invention employs such a configuration that: a first communication apparatus stores control information regarding identification information for establishing a connection between a second communication apparatus and the first communication apparatus in an SIP message and transmits the SIP message to the second communication apparatus; and the second communication apparatus that has received the SIP message updates identification information regarding the first communication apparatus based on the control information stored in the SIP message, the identification information being stored in the storing means of the second communication apparatus.

With this configuration, when a user moves or changes his provider, the SIP message containing the control information regarding the identification information (phone number, IP address, UPI, or the like) for establishing the connection to one's own apparatus can be transmitted. Thus, it is possible to update the identification information stored in the communication partner information storing means of the communication partner easily, inexpensively, quickly, and reliably.

BRIEF DESCRIPTION OF THE DRAWINGS

FIG. 7 is an explanatory diagram showing a structural example of an SIP message transmitted/received in the sequence of FIG. 6.

FIG. 10 is an explanatory diagram showing a structural example of an SIP message containing a MESSAGE method of the user information updating command of FIG. 9.

FIG. 11 is an explanatory diagram showing a structural example of the SIP message (OK) of FIG. 9.

FIG. 16 is an explanatory diagram showing a structural example of an SIP message exchanged not via the SIP server.

BEST MODE FOR CARRYING OUT THE INVENTION

Hereinafter, an embodiment regarding an IP phone unit connected to an IP network and including a phone book to enable a user to register an optional phone partner therein will be described. According to the embodiment below, a change of one's own phone number or an SIP address (SIP URI) is notified to a partner apparatus registered in a phone book of one's own apparatus to automatically update phone book data of the partner apparatus.

Embodiment 1

Figure 1:
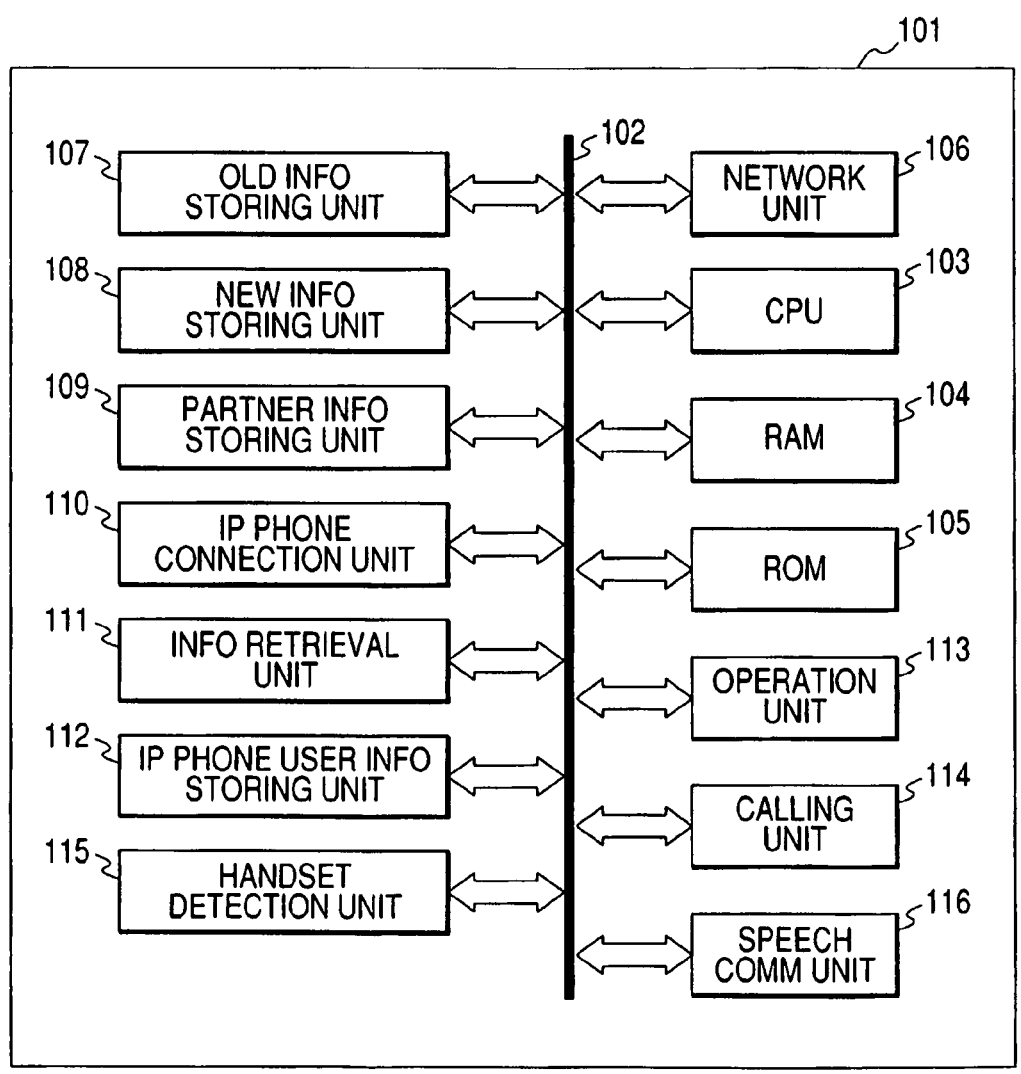
FIG. 1 is a block diagram showing a configuration of an IP phone unit employing the present invention, particularly a configuration needed by a side which transmits a notification of a user information change or an updating command of user information.

FIG. 1 shows a structure of an IP phone unit 101 of the present invention. FIG. 1 shows a configuration needed by an apparatus of a side which transmits the notification of a change of user information such as a phone number, a URI or an IP address which results from, for example, a removal or provider changing, or an updating command of the user information.

Referring to FIG. 1, reference numeral 101 denotes the entire IP phone unit, 102 denotes an internal bus for transferring internal data of the IP phone unit 101, 103 denotes a CPU for controlling the IP phone unit 101, 104 denotes a RAM for providing a program working area of the CPU 103, and 105 denotes a ROM for storing a program or table data of the CPU 103.

Further, reference numeral 106 denotes a network unit for transferring data with the outside of the IP phone unit 101, 107 denotes an old information storing unit for storing information on a former phone number or the like of the IP phone unit 101, 108 denotes a new information storing unit for storing information on a new phone number or the like of the IP phone unit 101, and 109 denotes a partner information storing unit for storing information on a phone number or the like of a partner of speech communication executed by using the IP phone unit 101.

Reference numeral 110 denotes an IP phone connection unit for transmitting/receiving an SIP message between the IP phone unit 101 and an outside SIP server or an outside IP phone unit by using the network unit 106 to establish communication. The IP phone connection unit 110 transmits/receives the SIP message with the outside SIP server or the outside IP phone unit by using a connection on a TCP (UDP)/IP secured by the network unit 106.

Reference numeral 111 denotes an information retrieval unit for retrieving a phone number or the like stored in the partner information storing unit 109, 112 denotes a user storing unit for storing such as name information of the IP phone user 101, and 113 denotes an operation unit for instructing a partner stored in the partner information storing unit 109 to transmit update processing of one's own phone number. The operation unit 113 is configured as an operation panel which includes a keyboard, a display unit, and the like of the device.

Reference numeral 114 denotes a calling unit for calling a user of the IP phone unit 101, 115 denotes a handset detection unit for detecting whether a handset is hooked up or not, and 116 denotes a speech communication unit for executing speech communication by an IP phone, which includes a transmitter/receiver or other necessary voice input/output units.

Figure 2:
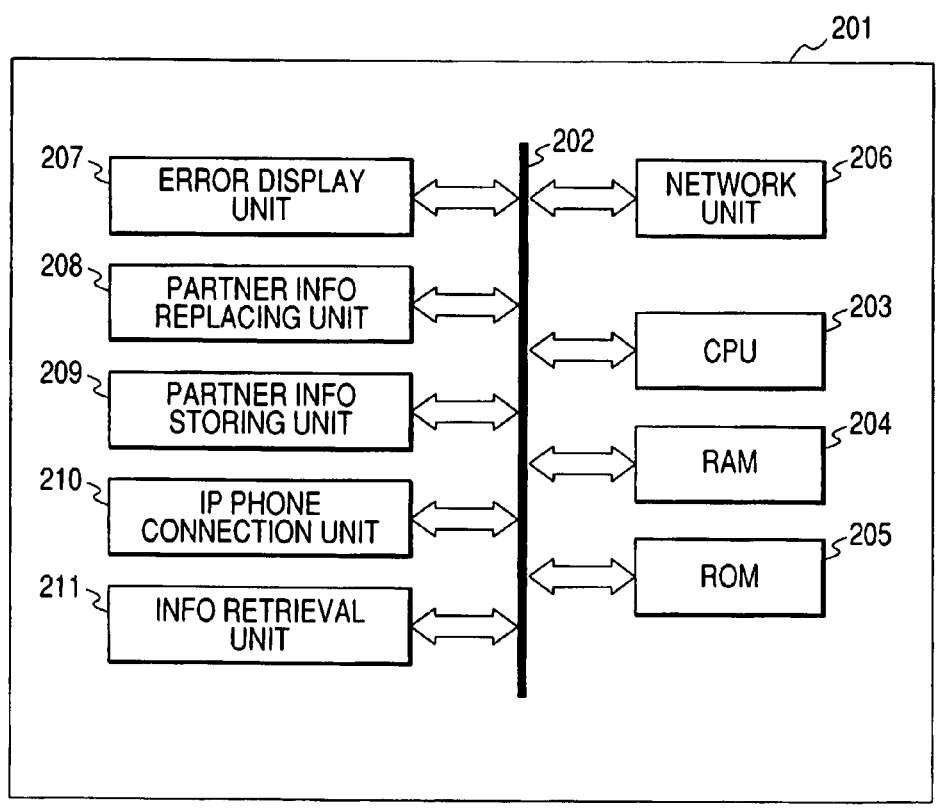
FIG. 2 is a block diagram showing a configuration of the IP phone unit employing the present invention, particularly a configuration needed by a side which receives the notification of the user information change or the updating command of the user information.

FIG. 2 is a block diagram showing a structure of the IP phone unit of the present invention. FIG. 2 shows a configuration needed by an apparatus of a side which receives a notification of a change of user information on a phone number, a URI, or an IP address which results from a removal or provider changing, or an updating command of the user information from the IP phone unit of FIG. 1.

Note that the phone unit of this type is usually constructed as a product in which the configurations of FIGS. 1 and 2 are integrated. In this case, needless to say, members of FIG. 2 similar to those of FIG. 1 denoted by reference numerals 100's (similar in configuration to those of FIG. 1 as described below) may be appropriately made common to the members of FIG. 1 by those skilled in the art.

Referring to FIG. 2, reference numeral 201 denotes the entire IP phone unit, 202 denotes an internal bus for transferring internal data of the IP phone unit 201, 203 denotes a CPU for controlling the IP phone unit 201, 204 denotes a RAM for providing a program working area of the CPU 203, 205 denotes a ROM for storing a program or table data of the CPU 203, 206 denotes a network unit for exchanging data with the outside of the IP phone unit 201, 207 denotes an error display unit for displaying errors, 208 denotes a partner information replacing unit for replacing stored information based on information sent from a speech communication partner, 209 denotes a partner information storing unit for storing information on phone numbers of partners of speech communication executed by using the IP phone unit 201, 210 denotes an IP phone connection unit for transmitting/receiving an SIP message between the IP phone unit 201 and an outside SIP server or an outside IP phone unit by using the network unit 206 to establish communication, and 211 denotes an information retrieval unit for retrieving information on a phone number or the like stored in the partner information storing unit 109.

Figure 3:
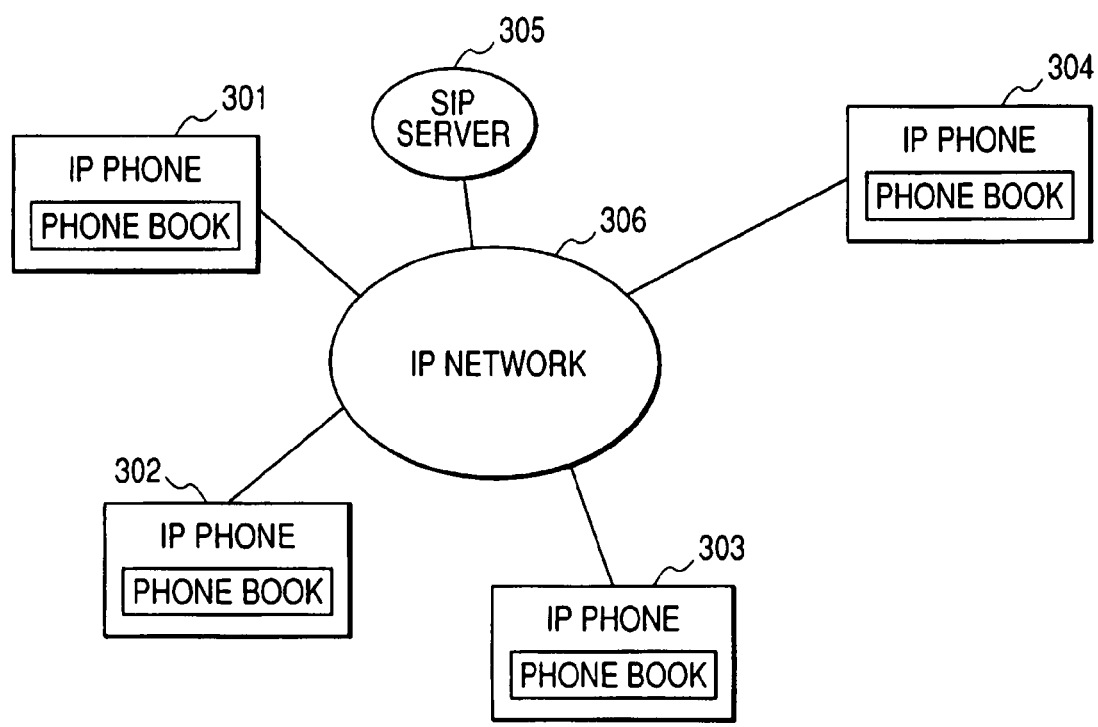
FIG. 3 is an explanatory diagram showing a network environment in which the IP phone unit employing the present invention is operable.

FIG. 3 shows a configuration of a network to which the IP phone unit is connected. As shown, IP phone units 301, 302, 303, 304 ( . . . ), and an SIP server 305 are connected to an IP network 306. The IP network 306 includes public WAN such as Internet, or an IP network such as Intranet in a company.

Figure 4:
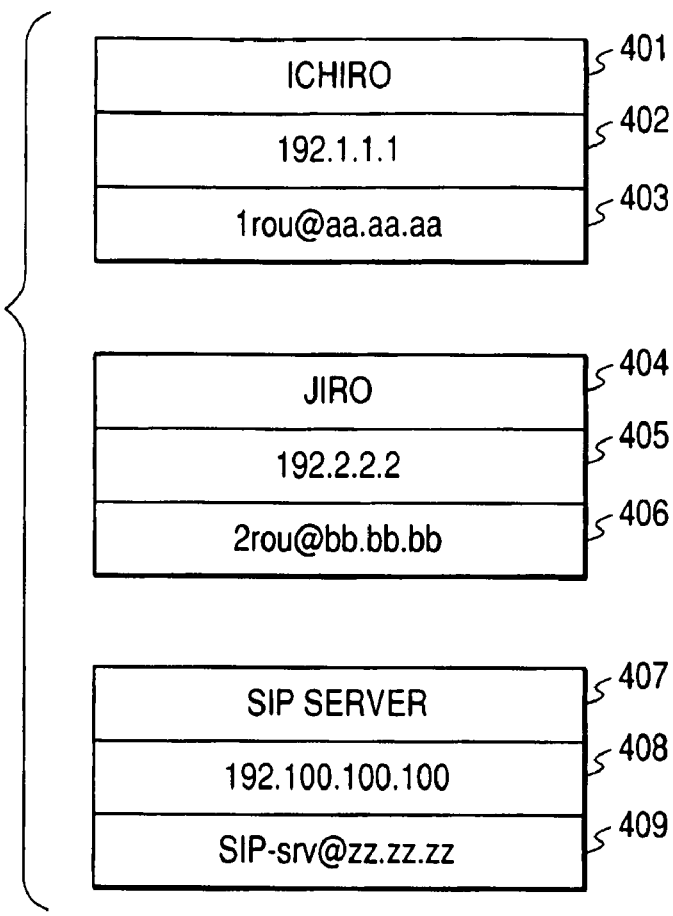
FIG. 4 is an explanatory diagram showing a phone book data structure of the IP phone unit employing the present invention.

FIG. 4 shows an example of contents stored in the partner information storing unit 109 of FIG. 1. The example of FIG. 4 shows two speech communication partners, Ichiro and Jiro, and three records regarding the SIP server.

Referring to FIG. 4, reference numeral 401 denotes a name of a speech communication partner (Ichiro), 402 denotes an IP address of a host of the speech communication partner, and 403 denotes a URI (SIP address) of the speech communication partner. Similarly, reference numeral 404 denotes a name of a speech communication partner (Jiro), 405 denotes an IP address thereof, and 406 denotes a URI thereof. A reference numeral 407 denotes a name of an SIP server, 408 denotes an IP address of the SIP server, and 409 denotes a URI of the SIP server.

Figure 5:
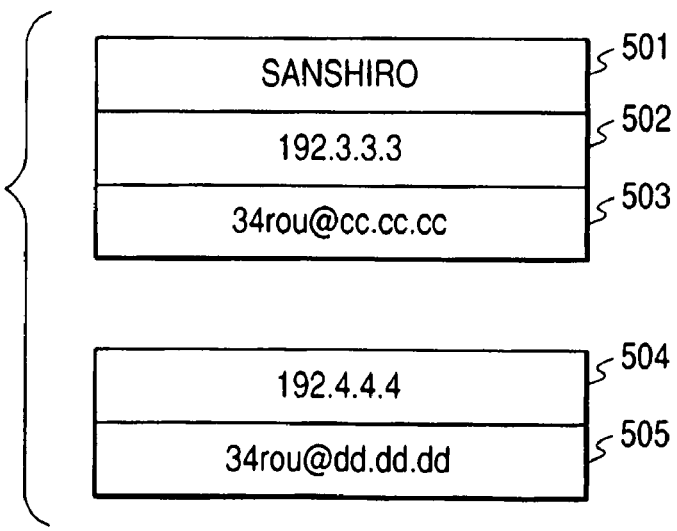
FIG. 5 is an explanatory diagram showing structures of new and old pieces of user information stored in the IP phone unit employing the present invention.

FIG. 5 shows an example of information stored in a storing unit of the IP phone unit 101. In the IP phone unit of FIG. 5, an IP address or a URI is changed because of user's (Sanshiro's) removal or the like. For example, the changing of the IP address or the URI is executed through a predetermined user interface which uses the operation unit 113. Referring to FIG. 5, reference numeral 501 denotes user's name (Sanshiro) of the IP phone unit stored in the IP phone user information storing unit 112, 502 denotes an old (before removal) IP address of the IP phone unit stored in the old information storing unit 107, 503 denotes an old URI of the IP phone unit stored in the old information storing unit 107, 504 denotes a new (after removal) IP address stored in the new information storing unit 105, and 505 denotes a new URI of the IP phone unit stored in the new information storing unit 105.

Figure 6:
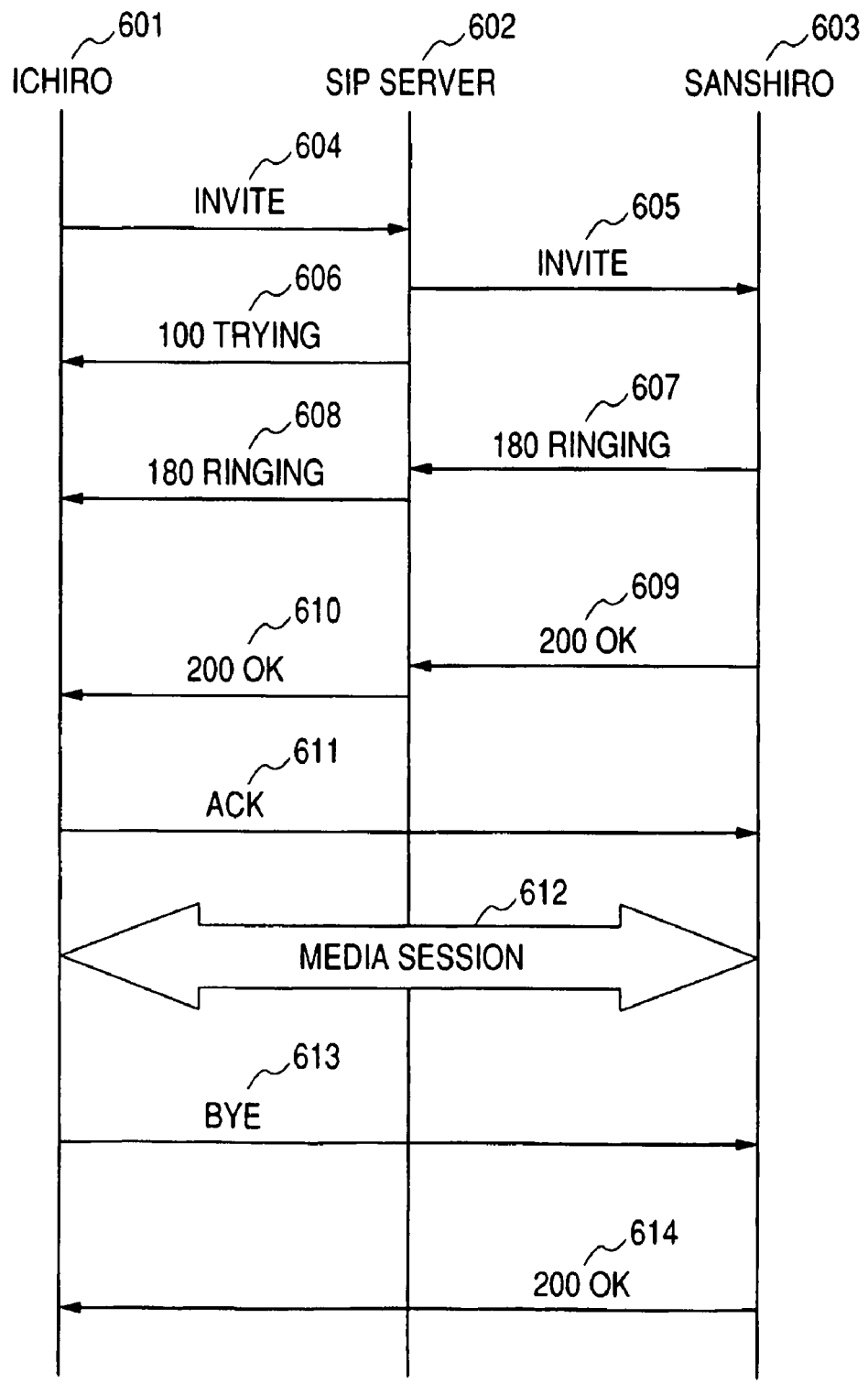
FIG. 6 is an explanatory diagram showing a sequence of IP phone communication carried out by the IP phone unit using an SIP server.

FIG. 6 is a sequential diagram showing a procedure of a start to an end of general IP phone communication using an SIP. The shown communication example is made between the IP phones of Ichiro 601 and Sanshiro 603, and a call and an incoming call are controlled by an SIP server 602. The IP phone unit of the embodiment uses the same procedure as shown in FIG. 6 for normal speech communication.

Referring to FIG. 6, first, SIP messages (INVITE) 604 and 605 are transferred between Ichiro 601, the SIP server 602, and Sanshiro 603. During calling by the IP phone unit of Sanshiro 603, SIP messages 606 to 608 (100 Trying, 180 Ringing) are transmitted to the IP phone unit of Ichiro 601. When a user responds by the IP phone unit of Sanshiro 603, SIP messages 609 and 610 (200 OK) are transmitted to the IP phone unit of Ichiro 601. When the IP phone unit of Ichiro 601 checks those messages, an SIP message (ACK) is transmitted to the IP phone unit of Sanshiro 603, thereby executing actual speech communication in a media session 612. The speech communication is finished by direct exchange of the SIP message 611 (BYE) to an SIP message 614 (200 OK) between user terminals.

FIG. 7 shows a structural example of the SIP message of FIG. 6. Reference numeral 701 corresponds to the SIP message 604 (INVITE), 702 denotes a Contact header from among SIP headers, 703 corresponds to an SIP message 606 (100 Trying), 704 corresponds to a Contact header from among the SIP headers, 705 corresponds to the SIP message 609 (200 OK), 706 denotes a Contact header from among the SIP headers, 707 corresponds to the SIP message 610 (200 OK), and 708 denotes a Contact header from among the SIP headers. As shown, the SIP message is described in a text format compliant with RFC 822.

Figure 8:
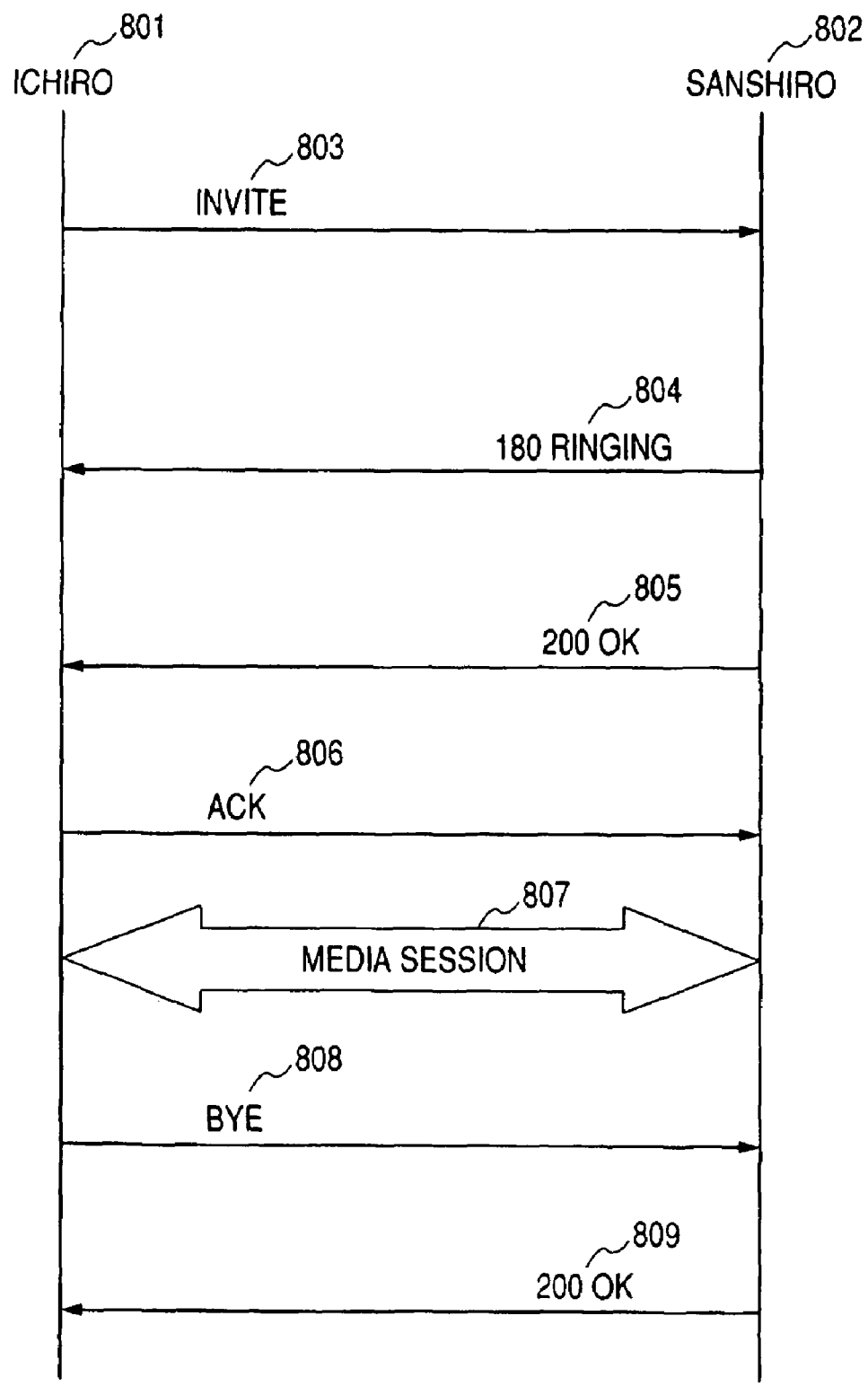
FIG. 8 is an explanatory diagram showing a sequence of IP phone communication directly carried out by the IP phone device without using the SIP server.

FIG. 8 shows a procedure of a start to an end of speech communication directly executed between the IP phone units by using the SIP without using the SIP server. When an IP address or a URI of a partner is known, as shown in FIG. 8, communication can be directly carried out between the IP phone units without using the SIP server. The example of communication of FIG. 8 is made between Ichiro (801) and Sanshiro (802), and in particular a sequence of INVITE, Ringing, OK and ACK of SIP messages (803 to 806) is directly exchanged between the user terminals. Actual speech communication is carried out by a media session 807, and finished by exchanging an SIP message 808 (BYE) to an SIP message 809 (200 OK). Structures of those SIP messages are similar to those shown in FIG. 7. However, because of no passage through the SIP server, for example, a header indicating passage through the SIP server (192. 100. 100. 100 is an address of the SIP server: 408 of FIG. 4) as in the case of "Vian SIP/2.0/UDP 192. 100. 100. 100: 5060" shown in FIG. 7 is not used.

Figure 9:
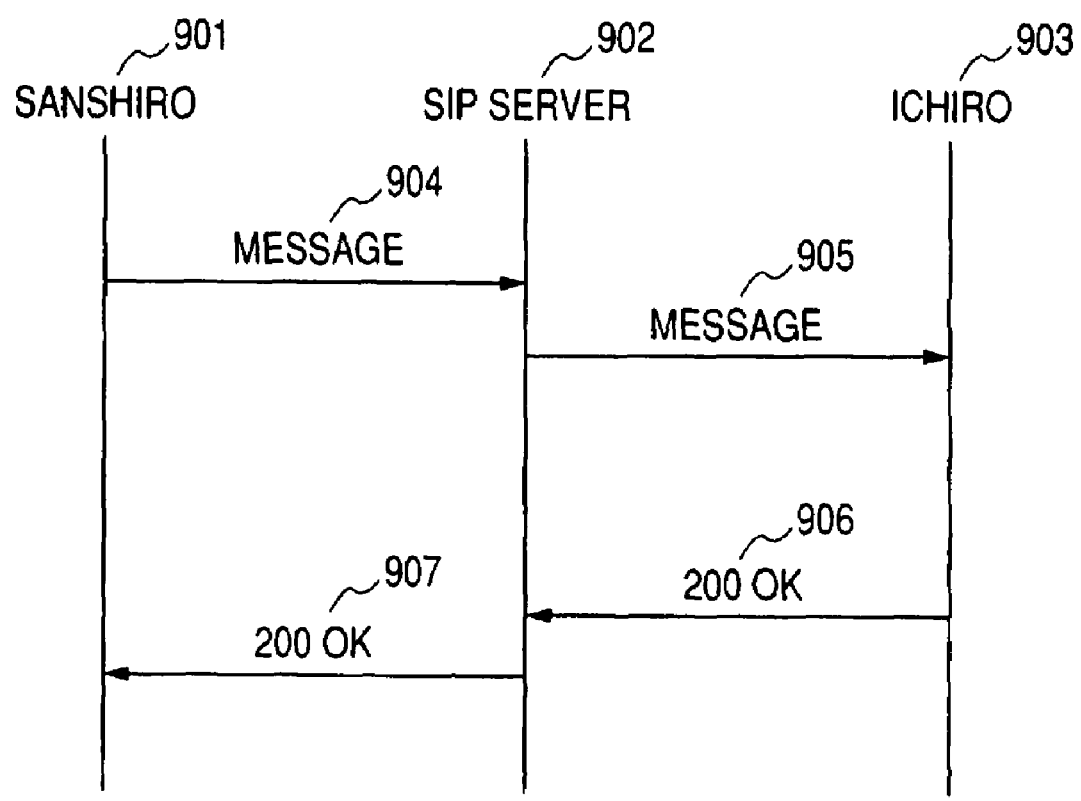
FIG. 9 is an explanatory diagram showing a transmitting/receiving sequence of the user information updating command by the IP phone unit employing the present invention.

FIG. 9 shows a situation of information exchanging by SIP to automatically update a phone book according to the present invention, and FIG. 10 shows contents of an SIP message transferred as shown in FIG. 9.

The SIP message can be used not only for replacing a predetermined request/response message but also for transmitting/receiving optional information by using a structure of "SIP Message Body" (MESSAGE method: RFC 2543, Chapter 8).

Referring to FIG. 9, first, SIP messages 904 and 905 including the MESSAGE method are transmitted from an IP phone unit of Sanshiro 901, to which the user has moved as described above with reference to FIG. 5, to an IP phone unit of Ichiro 903 via an SIP server 902, and SIP messages 906 and 907 (200 OK) indicating acceptance are transmitted from the IP phone unit of Ichiro 903 of a reception side to the IP phone unit of Sanshiro 901.

FIG. 10 shows a structure of the SIP message of FIG. 9. AN SIP message 1001 of FIG. 10 corresponds to the SIP message 904 (similar to 905 except for a header indicating relaying of the SIP server), reference numeral 1002 denotes a user information updating command ("!!!! replace-telephone-number"), 1003 denotes a name (Sanshiro), 1004 denotes an old IP address (corresponding to 502 of FIG. 5), 1005 denotes a new IP address (corresponding to 504 of FIG. 5), 1006 denotes an old URI (corresponding to 503 of FIG. 5), and 1007 denotes a new URI (corresponding to 505 of FIG. 5). By predefining a format of such a MESSAGE method for updating phone book, old and new pieces of information can be transmitted/received together with the user information updating command (or phone book updating command) 1002 to update phone book data.

FIG. 11 shows structures of the SIP messages (OK) 906 and 907 transferred as shown in FIG. 9. AN SIP message 1101 of FIG. 11 corresponds to the SIP message 906 of FIG. 9, and an SIP message 1102 corresponds to the SIP message 907. A method header of "OK" at the start and a lower CSeq header show that the transmitted MESSAGE method by the IP phone unit of Ichiro 903 has been received (or requested phone book data updating will be executed/has been executed).

Figure 12:
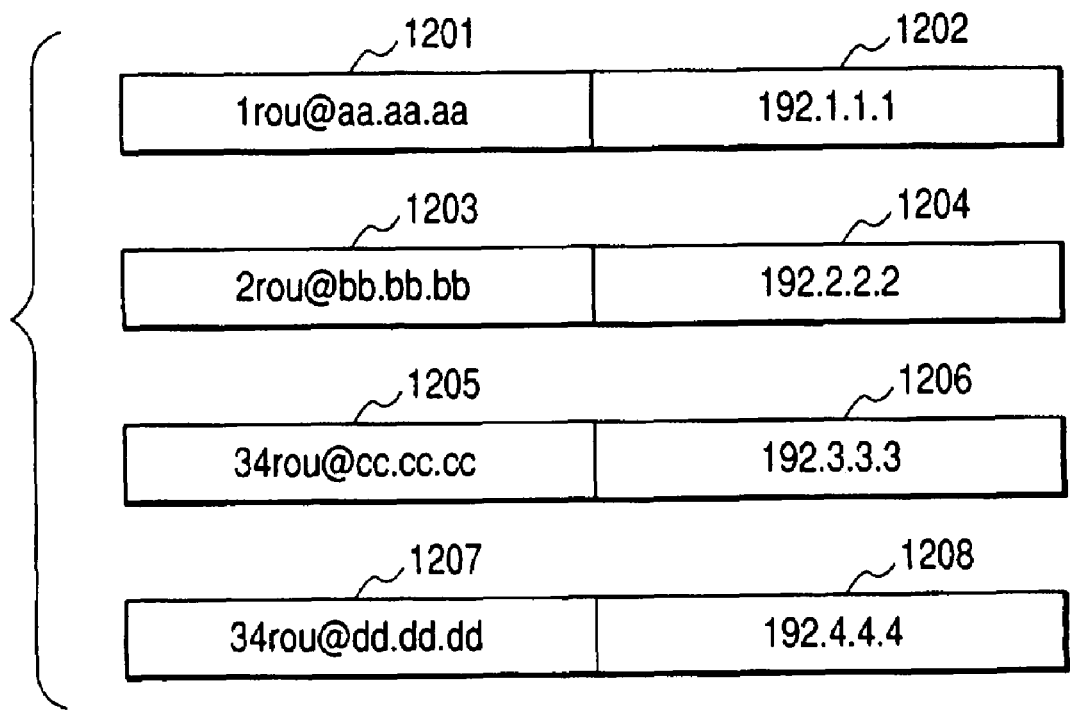
FIG. 12 is an explanatory diagram showing a correspondence between a URI and an IP address stored by an SIP server 305.

FIG. 12 shows a correspondence between a URI and an IP address stored in the storing unit of the SIP server 305. Reference numeral 1201 denotes a URI of Ichiro, and 1202 denotes an IP address of Ichiro. 1203 denotes a URI of Jiro, and 1204 denotes an IP address of Jiro.

Among those, pieces of user information of Ichiro and Jiro are stored in the partner information storing unit 209 without being changed. On the other hand, information of Sanshiro stored in the partner information storing unit 209 is subjected to control described below and to MESSAGE method exchanging to be updated by the partner information replacing unit 208. In other words, an old URI 1205 of Sanshiro and an old IP address 1206 of Sanshiro are respectively updated to a new URI 1207 of Sanshiro and a new IP address 1208 of Sanshiro.

Next, an operation of the aforementioned configuration will be described by referring to FIGS. 13 to 15, 17 and 18.

Figure 13:
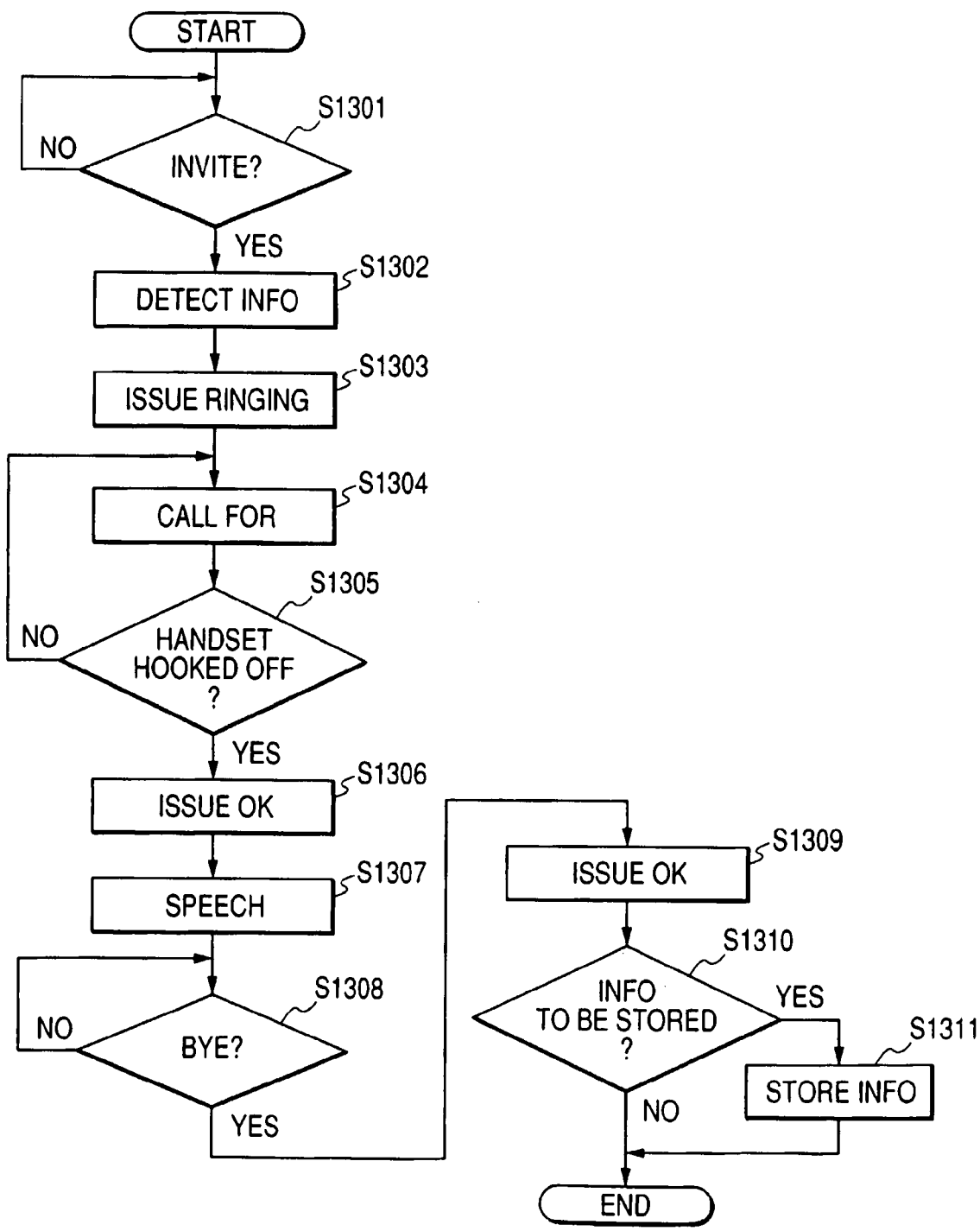
FIG. 13 is a flowchart showing a communication control sequence executed on an arrival side of the user information updating command.
Figure 14:
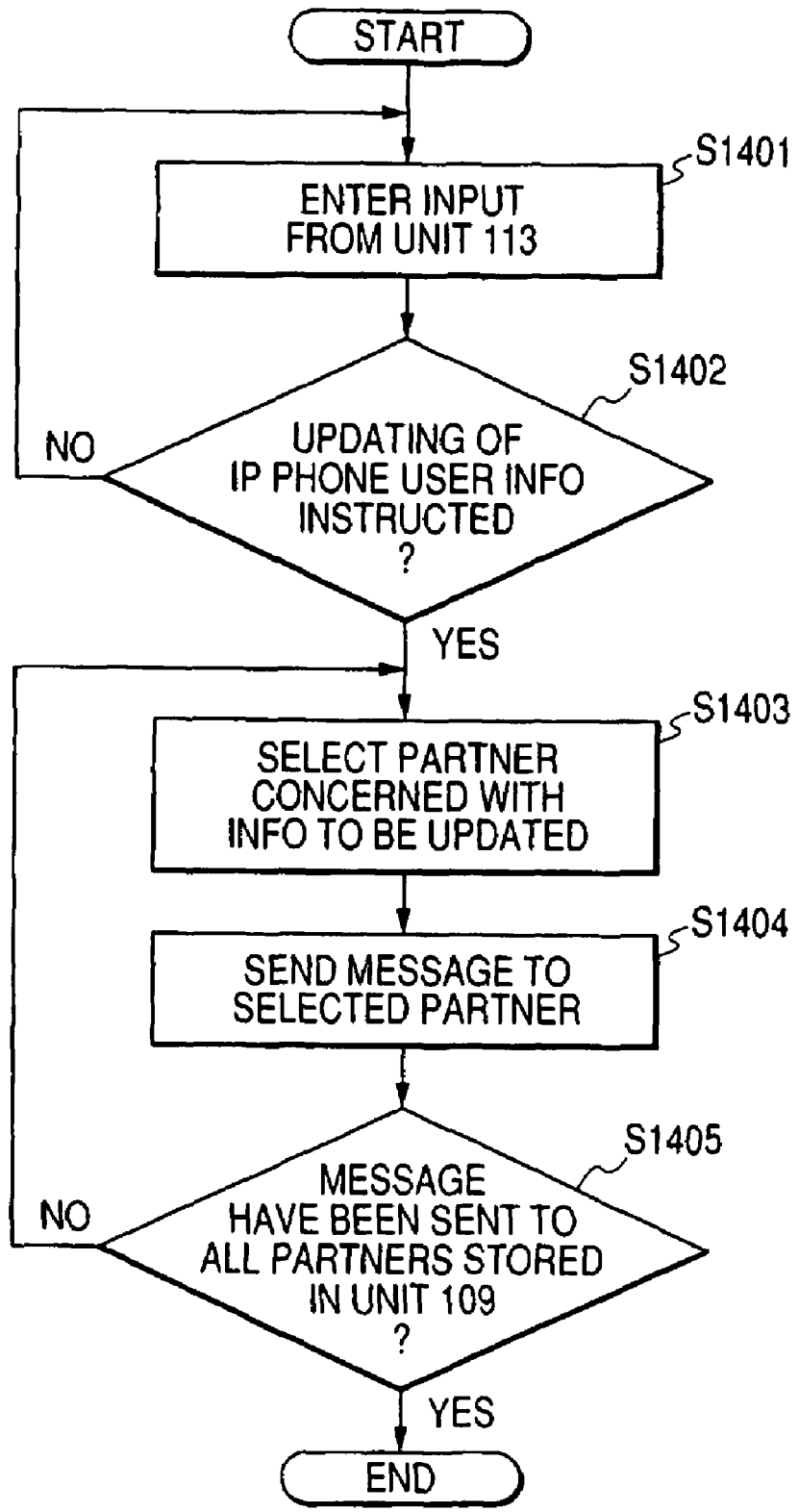
FIG. 14 is a flowchart showing a communication control sequence executed on a transmission side of the user information updating command.
Figure 15:
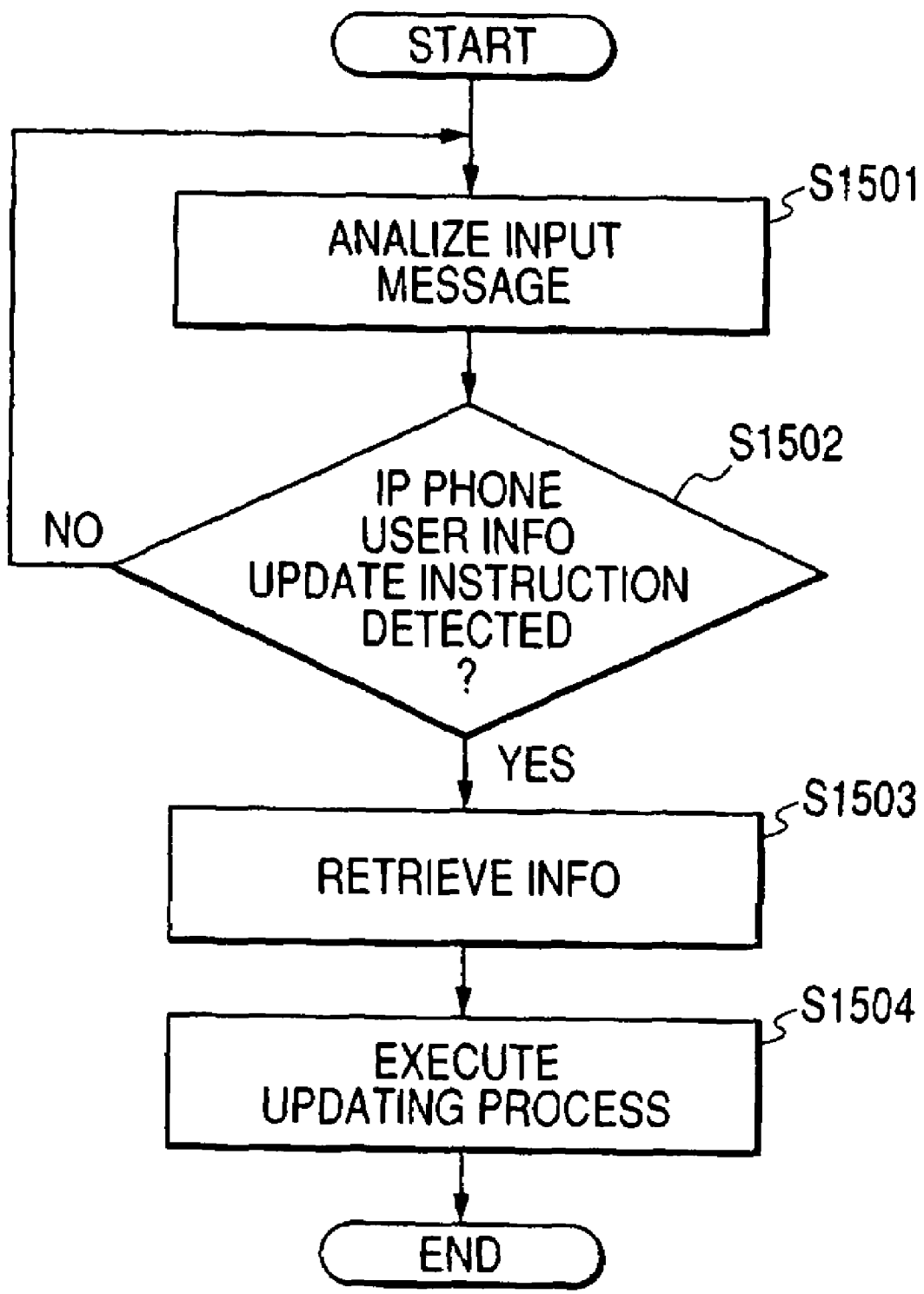
FIG. 15 is a flowchart showing a communication control sequence executed on a reception side of the user information updating command.

FIG. 13 shows a procedure of storing an IP address when a call comes from the IP phone unit to the IP phone unit 101 by using the SIP server. FIG. 14 shows a procedure of transmitting an own user information updating command to a partner stored in the partner information storing unit 109 by the IP phone unit 101. FIG. 15 shows a procedure of receiving the user information updating command sent from the IP phone unit 101 to execute phone book updating processing by the IP phone unit 201. The control procedures of FIGS. 13 to 15 are described in control program formats of the CPU 103 or the CPU 203 and stored in the ROM 105 and the ROM 205.

FIG. 16 shows a specific example of the SIP message shown in the sequence of FIG. 8. A reference numeral 1601 corresponds to the SIP message 803, 1602 denotes an SIP request, and 1603 corresponds to the SIP message 805.

Figure 17:
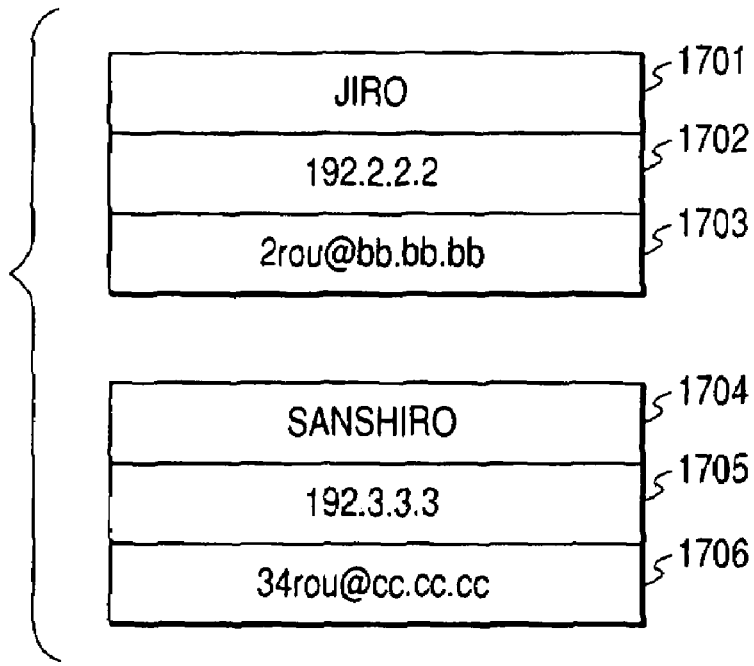
FIG. 17 is an explanatory diagram showing a structural example of phone book data before updating.
Figure 18:
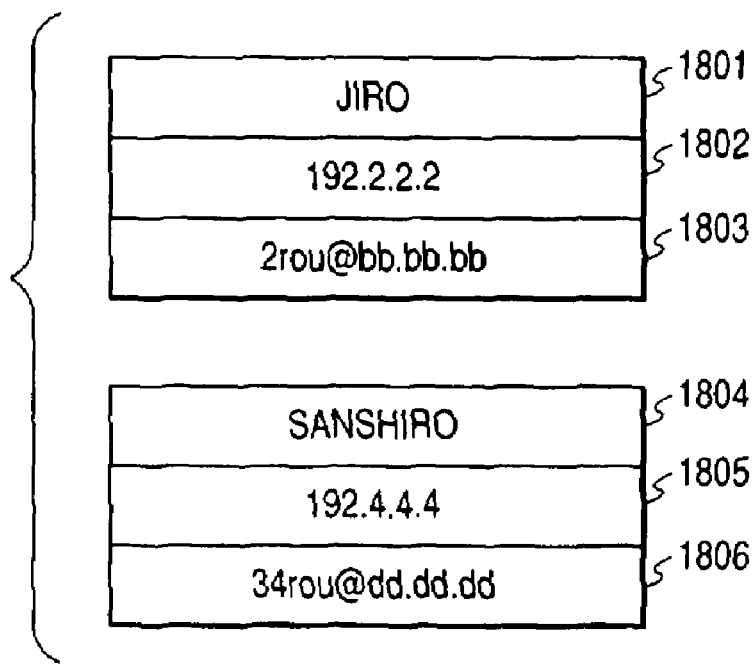
FIG. 18 is an explanatory diagram showing a structural example of phone book data after updating.

FIG. 17 is an example of information stored in the partner information storing unit 109 of the IP phone unit 201 showing a state before updating processing of the phone book data of this embodiment. FIG. 18 is an example of information stored in the partner information storing unit 209 of the IP phone unit

201 showing a state after updating processing of the phone book data of this embodiment.

First, referring to FIG. 13, the general speech communication procedure of the IP phone shown in FIG. 6 and a role of the phone book in the IP phone will be described. FIG. 13 shows a processing procedure of the IP phone unit on a call incoming side in the speech communication procedure of FIG. 6. Hereinafter, description will be made by citing the members of the IP phone unit 101.

In step S1301 of FIG. 13, the CPU 103 of the IP phone unit 101 waits for arrival of INVITE messages (604 and 605 of FIG. 6, and 701 of FIG. 7) at the IP phone communication unit 110 from the IP network through the network unit 106.

Upon reception of the SIP messages INVITE in the step S1301, the CPU 103 of the IP phone connection unit 110 detects an IP address, a user name, or the like of a partner from contents of an SIP header in step S1302.

The SIP message of an INVITE method that has reached the IP phone connection unit 210 of the IP phone unit 201 is structured as in the case of the reference numeral 703 of FIG. 7. The Contact header of the reference numeral 704 contained therein is information of the partner who has sent the SIP message of the INVITE method. The SIP message can be directly exchanged using the information. The CPU 103 analyzes contents of such a header to make preparation for storage in the phone book.

In step S1303, the CPU 103 of the IP phone unit 101 transmits an SIP message Ringing (607 of FIG. 6) from the IP phone connection unit 110 to the partner. Further, in step S1304, the CPU 103 of the IP phone unit 101 calls the user by using the calling unit 114.

In step S1305, the CPU 103 of the IP phone unit 101 detects hooking-off of the handset by the user to respond by using the handset detection unit 115, and returns to the step S1304 to continue calling when there is no response.

When user's response is detected, the process moves to step S1306 to issue an SIP message OK (609 of FIG. 6) from the IP phone connection unit 110 to the partner. Then, in step S1307, the CPU 103 of the IP phone unit 101 allows the user to execute speech communication between each other by using the speech communication unit 116.

In step S1308, the CPU 103 detects arrival of an SIP message of a BYE method (613 of FIG. 6) at the IP phone connection unit 110.

Upon determination of the arrival of the SIP message BYE at the IP phone connection unit 110, the CPU 103 finishes the speech communication of the speech communication unit 116, and proceeds to step S1309 to transmit an SIP message OK to the partner.

The process thus far is general processing of the IP phone based on an SIP protocol. According to this embodiment, however, as the partner information storing unit 109 is included to realize function of the phone book, the following processing is further carried out.

That is, in step S1310, the CPU 103 causes the user of the IP phone unit 101 to decide storing of information obtained from the SIP sequence of the last speech communication using 2a proper user interface of the operation unit 113, and proceeds to step S1311 in the case of storing the information obtained from the SIP sequence.

In the step S1311, the CPU 103 causes the partner information storing unit 109 to store the IP address of the speech communication partner contained in the Contact header 704 of the SIP protocol INVITE method 703, a host name contained in another header, or the like. Examples of information thus stored in the partner information storing unit 109 are pieces of information denoted by the reference numerals 401 to 406 of FIG. 4. As described above, among those, reference numeral 401 is a name of the partner, reference numeral 402 is an IP address detected from the Contact header, and reference numeral 403 is a URI detected from a From header. Reference numerals 404 to 406 can be obtained by a similar method for another speech communication.

As shown in FIG. 6, the situation of the IP phone communication via the SIP server is as described above. By using the information (IP address and URI) of the speech communication partner accumulated as the phone book data in the partner information storing unit 109, direct speech communication can be carried out without passing through the SIP server as shown in FIG. 8.

In the example of FIG. 8, as described above, the call is made from the IP phone unit of Ichiro 601 to the IP phone unit of Sanshiro 603. In this case, a URI or the like of an INVITE method can be generated by using the IP address 402 or the like stored in the phone book (partner information storing unit 109) of the IP phone unit of Ichiro 601. For example, the SIP message 803 (INVITE) of FIG. 8 can be generated as in the case of reference numeral 1601 of FIG. 16, and an IP address is directly described in a URI section in notation of an INVITE method 1602, realizing a format in which passage through the SIP server is not necessary. Similarly, the SIP message 805 of FIG. 8 can be generated as in the case of reference numeral 1603 of FIG. 16.

Next, updating processing of the phone book data will be described. When the IP address and the URI of the IP phone unit 101 is changed because of user's removal or provider changing, the phone book data can be automatically updated as shown in FIGS. 14 and 15 according to this embodiment.

Now, description will be made of an example where the IP phone unit 101 (FIG. 1) transmits a user information updating command by a procedure of FIG. 14, and the phone book data of the IP phone unit 201 (FIG. 2) is accordingly updated automatically by a procedure of FIG. 15.

In step S1401 of FIG. 14, the CPU 103 of the IP phone unit 101 fetches an input from the operation unit 113, determines whether an instruction has been issued or not to send a user information updating command to the partner stored in the partner information storing unit 109 in step S1402, and waits for an input unless the instruction has not been issued to send the user information updating command in the step S1401.

It is presumed that the IP phone unit 101 is an IP phone unit of Sanshiro which stores the user information 501 of FIG. 5 and, as described above, owing to a removal or the like, the IP address has been changed from the old IP address 502 to the new IP address 504, and the URI has been changed from the old URI 1503 to the new URI 1505.

Upon an input of a transmission instruction of a user information updating command in step S1402, the process proceeds to step S1403 to cause the user to select a partner to execute information updating from speech communication partners stored in the partner information storing unit 109. In this case, for example, the user selects Ichiro, who is specified by pieces of speech communication partner information 401, 402, and 403 of FIG. 4.

Then, in step S1404, the CPU 103 generates a MESSAGE body as in the case of the SIP message 1001 of FIG. 10 from the pieces of speech communication partner information 401, 402, and 403, the user information 501 of FIG. 5, and old and new IP addresses and URI information of the reference numerals 502, 503, 504, and 505, and transmits the MESSAGE body to the selected partner (IP phone unit of Ichiro).

As described above, the SIP message 1001 uses the MESSAGE method, and contains the user information updating command 1002 which instructs updating of contents of the IP phone unit having the partner information storing unit storing the information of the IP phone unit 101 therein.

By using such a MESSAGE method, even in the middle of a media session such as a busy state of the IP phone of the partner, it is treated as another session, and thus communication processing is possible. As the processing can be executed without being accompanied by an operation of the IP phone user such as Ringing, information is updated without any work of the user on the user information updating command reception side, whereby convenience of the IP phone unit user can be enhanced.

Subsequently, in step S1405, the CPU 103 determines whether a partner still exists or not to whom no user information updating command has been sent among the speech communication partners stored in the partner information storing unit 109. If a partner still exists, the process returns to the step S1403 to repeat the selection of a transmitting target partner. Upon transmission of user information updating commands to all the partners registered in the partner information storing unit 109, the process is finished.

The user interface has been considered which selects the partners to whom no user information updating command has been transmitted one by one in the step S1403 among those registered in the partner information storing unit 109, and transmits the user information updating commands to the selected partners. Needless to say, however, a user interface may be configured which first selects a plurality of speech communication partners as partners to execute information updating, and then transmits user information updating commands altogether.

On the other hand, at the IP phone unit 201 that has received the user information updating command, updating processing of the phone book data is executed as shown in FIG. 15.

Upon reception of the user information updating command, the CPU 203 of the IP phone unit 201 analyzes the SIP message input from the IP phone connection unit 210 through the network unit 206 in step S1501 of FIG. 15.

Then, in step S1502, the CPU 203 determines whether the input SIP message stores a MESSAGE method containing the user information updating command or not. If the user information updating command is not stored, the process proceeds to step S1501 for processing of another SIP method. The processing of another SIP method is not shown here, but it is presumed that the process proceeds to an appropriate processing from the step S1501.

In the step S1502, upon detection of the MESSAGE method containing the user information updating command as in the case of a character string 1002 of the message body 1001 of FIG. 10, the CPU 203 proceeds to step S1503.

In the step S1503, for example, the CPU 203 retrieves information stored in the partner information storing unit 209 from the message body input to the IP phone connection unit 210 such as 1003, 1004, 1005, 1006, and 1007 of the message body 1001 of FIG. 10 by using the information retrieval unit 211.

The CPU 203 detects that pieces of information to be updated are related to 1704 and are 1705 and 1706 from the information retrieval unit 211. In step S1504, the CPU 203 replaces contents stored in the partner information storing unit 209 by the partner information replacing unit 208 based on information in the step S1503.

As a result of the replacing processing, the contents of the partner information storing unit 209 are updated from a state shown in FIG. 17 to that shown in FIG. 18. As shown in the figure, the IP address and the URI of Sanshiro are respectively updated from 1705 to 1805 and from 1706 to 1806.

A transmitting/receiving sequence of the user information updating command executed under the control of FIGS. 14 and 15 becomes as shown in FIG. 9. As described above, the SIP message 904 of FIG. 9 is structured as in the case of the SIP message 1001 of FIG. 10, the SIP message 906 is structured as in the case of the SIP message 1101 of FIG. 11, and the SIP message 907 is structured as in the case of the SIP message 1102.

As described above, according to this embodiment, when a user moves, transfers or changes his provider, control information regarding updating of identification information such as a phone number, an IP address or a URI is transmitted to the communication partner by using the MESSAGE method of the SIP message, and the phone book information (identification information necessary for connection to an own apparatus stored in the partner information storing unit of the communication partner) of the communication partner can be automatically updated easily, inexpensively, quickly, and reliably.

Needless to say, depending on a reaction of the communication partner who returns response (OK or ACK) to a message of a specific method which is an SIP feature, it is possible to surely confirm transmission of an updating command to the partner. If OK is not returned, updating information can be surely transmitted by retrying.

Different from the conventional method using electronic mail, the information updating according to the embodiment can be surely carried out without any time lag, and executed by using the SIP which is originally necessary for communication. Thus, there is an advantage that in an apparatus of specifications which does not always need electronic mail, for example, an extra communication unit for transmitting/receiving electronic mail is not necessary.

The case where the IP phone unit having the changed user information updates the phone book data of another IP phone unit has mainly been described. However, by communication control similar to the above, it is possible to update a database of the user name/user information stored by the SIP server.

In the foregoing, not much consideration has been given to security regarding updating of the phone book information (identification information to establish a connection with the communication partner) or the contents of the phone book information storing means (partner information storing means), and the side that receives the updating command through the SIP message unconditionally updates the phone book information. Needless to say, however, a certain authentication procedure may be provided to update the phone book information or the contents of the phone book information storing means more safely. For such authentication, for example, a PGP public key authentication system described in Chapter 13.2 of RFC 2543 can be used. Through such authentication, acceptance or nonacceptance of the updating command of the SIP message is decided by the SIP message reception side, whereby personal information and privacy of the user can be surely protected.

The example where according to user's removal or provider changing, the SIP message storing the updating command of the phone book information is transmitted based on user's manual operation has been described. However, allocation of IP addresses to the network interface (e.g., network units 106 and 206 of FIGS. 1 and 2) can be automatically detected by the CPU of the IP phone unit (e.g., by using specifications of IPv6 or the like) without any user's work. Thus, when a change of the user information necessary for connection to an own unit of another apparatus is detected during apparatus transfer, the process may automatically proceed to transmission processing of the SIP message storing the updating command of the phone book information or user interface processing for starting the transmission processing. Accordingly, user's burdensome operation is not necessary, and the phone book information can be updated.

INDUSTRIAL APPLICABILITY

The case of carrying out the voice communication between the communication apparatus has mainly been described by using the terms of "IP phone unit", "speech communication", and the like. Needless to say, however, communication actually executed is not limited to voice communication, and the present invention can be implemented in an arbitrary communication apparatus which includes communication partner information storing means capable of using SIP to establish a connection, for storing identification information to establish a connection with a communication partner.

The present invention can be applied not only to the stand-alone communication deices such as the IP phone units of FIGS. 1 and 2 but also to a system which includes a plurality of apparatuses (e.g., host computer, interface device, reader, printer, and the like).

Distribution of software for realizing the method and the program of the present invention can be carried out by storing it in the program memory in advance at the time of shipping, and by using other storage media such as a floppy (registered trademark) disk, a hard disk, an optical disk, a magneto-optical disk, a CD-ROM, a CD-R, a magnetic tape, a non-volatile memory card, and a ROM. Alternatively, it is possible to employ a distribution method of introducing the software to the communication apparatus through the network and executing updating.

Needless to say, the software for realizing the method and the program of the present invention may be mounted not only as firmware or an application program but also as a part (e.g., device driver) of an operating system (OS) operated on a computer.

Furthermore, the software for realizing the method and the program of the present invention may be executed by the CPU in charge of main control of the operation of the entire apparatus. In addition, after the software is written in a memory disposed in an function expansion board inserted into a computer or a function expansion unit connected to the computer, a CPU or the like disposed in the function expansion board or the function expansion unit executes a part or all the operation based on an instruction of a program code thereof, thereby executing the software.

This application claims priority from Japanese Patent Application No. 2004-249412 filed Aug. 30, 2004, which is hereby incorporated by reference herein.

The invention claimed is:

1. A method for updating identification information of a communication apparatus, comprising:

in a first communication apparatus,
establishing a connection between a second communication apparatus and the first communication apparatus by transmitting an SIP message which includes identification information which identifies the first communication apparatus to the second communication apparatus, wherein old identification information and new identification information are set to the SIP message, and
executing a speech communication processing with the second communication apparatus; and in the second communication apparatus,
receiving the SIP message which includes the identification information which identifies the first communication apparatus from the first communication apparatus, and establishing the connection between the first communication apparatus and the second communication apparatus,
executing the speech communication processing with the first communication apparatus,
accepting a user designation for updating the identification information which identifies the first communication apparatus from a user of the second communication apparatus in response to finishing of the speech communication processing, and
updating the identification information which identifies the first communication apparatus, based on the new identification information included in the received SIP message, in a case where the user designation for updating the identification information is accepted.

2. A method according to claim 1, wherein the identification information includes an IP address and a URI.

* * * * *